Patented June 5, 1934

1,961,714

UNITED STATES PATENT OFFICE 1,961,714

PRODUCTION OF A CONCENTRATE OF TRUE MAPLE FLAVOR

Leo Skazin, Ottawa, Ontario, Canada

No Drawing. Application March 31, 1933, Serial No. 663,855

9 Claims. (Cl. 99—11)

This invention relates to a process for the manufacture of a concentrate of true, natural maple flavor.

The concentrate of true maple flavor can be used with advantage in its cream manufacture, confectionery, soda fountain products, soft drinks, baking and other related industries.

A method heretofore proposed for the preparation of maple flavor concentrate consists in precipitating sucrose from maple syrup as barium saccharate, filtering off the precipitate, neutralizing the excess of barium hydroxide with sulphuric acid, filtering off the second precipitate, and finally concentrating the filtrate which contains the maple flavor of the original maple syrup.

This process is complicated and requires the use of heavy chemicals such as barium oxide and sulphuric acid and the application of comparatively high temperatures, both of which tend to destroy or alter to a certain degree the delicate maple flavor.

The object of the present invention is to provide a process whereby a concentrate of true maple flavor may be simply and economically produced without impairment of the natural flavor. The invention contemplates the addition of a readily volatile liquid which is miscible with maple syrup or like maple product, which at the same time, without reacting chemically with the sugar, greatly decreases the solubility of sugar in the resultant liquid, and which retains the maple flavor in solution.

The process of the invention may be applied to maple sap, partially concentrated maple sap, maple syrup, maple sugar, special maple products of intense maple flavor, or a combination of any two or more of these maple products. It is preferable to select for treatment maple products having a relatively low content of invert sugar.

Cane sugar (sucrose) is practically insoluble in absolute ethyl alcohol. 100 parts of 70% alcohol dissolve about 13.0 parts of sucrose, whereas 100 parts of water dissolve 195.8 parts of sucrose. (Solubilities given are for 17.5° C.) It has been found, however, that when maple syrup or the like is treated with ethyl alcohol, the maple flavor remains in the solution, whereas sugar crystallizes out. Substances like acetone and some other alcohols, such as methyl alcohol or mixtures of such substances, have substantially the same effect as ethyl alcohol.

In accordance with this invention a volatile liquid of the character mentioned and preferably ethyl alcohol is added to maple syrup or the like to incorporate the flavor and cause the sugar to crystallize out. The crystallized sugar is filtered off and the remaining liquor containing the maple flavor may be evaporated to remove the volatile addition agent and part of the water and thus produce a concentrate of the desired true maple flavor.

By varying the density of the maple syrup, and/or the proportions of alcohol or other volatile liquid added, the proportion of sugar eliminated may be rendered more or less complete, and thus the degree of concentration of the maple flavor may be varied. The following table illustrates the effect of the addition of various proportions of ethyl alcohol to a maple syrup or solution of maple sugar of a density of 78.0 Bx. (specific gravity 1.40.)

| Parts 95% alcohol per 100 parts of syrup | Percent of total sugar eliminated | Concentration of maple flavor in product |
|---|---|---|
| 0 | ---------- | 1 |
| 11.1 | 52.7 | 2.1 |
| 25.0 | 65.8 | 2.9 |
| 42.9 | 73.7 | 3.8 |
| 66.7 | 80.6 | 5.2 |
| 100.0 | 86.2 | 7.2 |
| 150.0 | 90.0 | 10.0 |
| 233.3 | 92.1 | 12.6 |

If a high concentration of maple flavor in the product is required, the maple flavor concentrate may be treated again with the addition agent and more sugar removed. By repeating the process one or more times a very highly concentrated maple flavor product may be obtained.

The process of the invention may be advantageously carried out in accordance with the following more detailed description.

After selecting a suitable maple product, preferably, but not necessarily of intense maple flavor and low invert sugar content, it is brought to a suitable density, say between 70.0° to 90.0° Bx. but preferably 81.0° Bx., by concentrating maple sap or syrup, by dissolving in water or syrup the required quantity of maple sugar or in any other desired way. The hot syrup of suitable density thus produced is transferred to a water jacketed container of the character of a sugar crystallizer equipped with a stirrer, or of the LaFeuille type, and the temperature is brought to 78 to 50° C., preferably about 75° C. While agitating the syrup, warm ethyl alcohol of a strength up to 100% is gradually added. The total amount of alcohol added depends on how much sugar it is desired to remove from the syrup, or in other words on how strong the maple flavor concentrate is required to be, and may be widely varied.

Preferably a very small amount of powdered seed-crystals of cane sugar may be added to induce crystallization or the mixture may be continuously stirred until there is a spontaneous formation of sucrose crystals.

The alcohol is preferably heated to 40 to 50° C. before it is added to the syrup or mixture in the crystallizer. The agitation is continued during the process to facilitate the crystallization of the sugar, to prevent formation of lumps and to insure uniform distribution of the addition agent.

After addition of alcohol has been completed and crystallization of sucrose has progressed sufficiently, the mixture is cooled by admission of cold water to the jacket of the crystallizer, or otherwise, to increase the crystallization of the sugar which is less soluble in cold solution than in warm. A granular precipitate is thus formed which consists substantially of sugar, while the flavor is left in the alcoholic solution.

The crystals are then separated from the solution by a centrifuge or the like and are preferably washed with small amounts of the alcohol to remove flavor which may be left in them. Sugar may be readily recovered from the crystal mass which is mostly sucrose. The filtrate is concentrated, preferably in low vacuum pans, to recover the alcohol or other volatile addition agent, which, after dehydration, may be re-employed in the process in a cyclic manner. The filtrate is preferably concentrated to a density of 70.0 to 80.0° Bx.

It will be apparent that maple flavor concentrates of any desired strength may be produced by applying the process in two or more steps instead of one, as described. In this case the flavor concentrate from one treatment is re-treated as often as desired with the addition agent. The multi-step process effects economy in the amount of addition agent required.

The term "maple syrup" as used in the appended claims is intended to include maple sap, maple syrup, per se, or any aqueous solution containing maple sugar.

I claim:

1. A process for the production of a concentrate of true maple flavor which comprises the step of treating maple syrup with a volatile addition agent, which is miscible with the syrup and which reduces the solubility of sugar in the mixture so produced.

2. A process for the production of a concentrate of maple flavor which comprises mixing with maple syrup an addition agent miscible therewith and adapted to cause separation of sugar from the solution but which does not react chemically with sugar, allowing sugar to crystallize out and removing the same from the solution.

3. A process for the production of a concentrate of true maple flavor which comprises adding ethyl alcohol to maple syrup, agitating the mixture during the addition of the alcohol and while crystallization of sugar proceeds, and separating the sugar crystals from the solution.

4. A process as defined in claim 3, wherein the crystal-free solution is concentrated by evaporation.

5. A process as defined in claim 3, wherein successive quantities of alcohol are added to the syrup to crystallize out the required amount of sugar.

6. A process for the production of a concentrate of true maple flavor comprising mixing ethyl alcohol with maple syrup of a density of 81.0° Bx., continuing agitation until sugar crystallization substantially ceases, removing the sugar crystals and concentrating the remaining solution.

7. A process as defined in claim 6, wherein the solution is cooled after the final addition of alcohol to increase the crystallization of sugar and the concentration of the flavor in the solution.

8. A cyclic process for the production of a concentrate of true maple flavor comprising mixing with maple syrup a volatile addition agent miscible therewith and which does not react chemically with sugar, agitating the mixture, removing the sugar crystals formed, recovering from the remaining liquor by evaporation the addition agent and returning it for use in the initial stages of the process.

9. A process as defined in claim 8, wherein the concentrate produced by evaporation of the addition agent is subjected to at least one repetition of the process defined.

LEO SKAZIN.